United States Patent [19]
Menard

[11] 3,796,105
[45] Mar. 12, 1974

[54] POTTER'S WHEEL DRIVE SYSTEM

[76] Inventor: George Menard, 4237 Coloma, Woodland Hills, Calif. 91364

[22] Filed: Oct. 30, 1972

[21] Appl. No.: 302,301

[52] U.S. Cl. .................................. 74/209, 425/86
[51] Int. Cl. ...................... F16h 13/10, B28b 21/42
[58] Field of Search ...... 425/263, 459; 74/209, 207; 318/332

[56] References Cited
UNITED STATES PATENTS

| | | | |
|---|---|---|---|
| 2,638,653 | 5/1953 | Adams | 425/263 |
| 1,246,823 | 11/1917 | Shelton | 74/209 |
| 3,562,618 | 2/1971 | Tseigas | 318/332 |
| 2,097,071 | 10/1937 | Lichten | 74/209 |
| 3,671,835 | 6/1972 | McMenamy et al. | 318/332 |
| 2,832,227 | 4/1958 | MacLeod | 74/209 |
| 3,229,539 | 1/1966 | Ablon | 74/209 |

Primary Examiner—Benjamin W. Wyche
Assistant Examiner—Allan Russell Burke

[57] ABSTRACT

A drive system for a potter's wheel which is rotatable about a shaft. The wheel has a downwardly depending lip whose inner surface forms a drive surface. A motor includes a drive shaft which is connected to a drive member which is spring loaded against the wheel drive surface to impart rotational movement of the wheel. The motor is positioned on a mount which is pivotably movable with respect to the wheel housing, enabling the motor to be spring biased and impart frictional engagement between the drive member and the drive surface. A motor control enables the motor to rotate at any variable speed and remain constant irrespective of load.

9 Claims, 8 Drawing Figures

POTTER'S WHEEL DRIVE SYSTEM

BACKGROUND OF THE INVENTION

1. Field of the invention

The field of art to which the invention pertains includes the field of potter's wheels, particularly with respect to a drive system incorporated for use with a potter's wheel.

2. Description of the prior art

The best known prior art includes U.S. Pat. Nos. 2,547,666; 2,638,653; and 2,625,827.

"Throwing" on the potter's wheel has been the chief method of pottery making in all countries from early times. As the wheel is spun, the potter draws the revolving clay up with his thumbs and fingers to the desired shape. Skilled "throwers" are able to fashion beautiful and sturdy ware using a potter's wheel.

Conventional potter's wheels are extremely crude in that a very heavy kick-wheel is used as the mode of power to turn the wheel upon which the potter's clay is drawn. The kick-wheel operates on the principle of a standard fly wheel. This type of wheel is not normally utilized by most amateur potters, simply because it is difficult to control, as well as requiring the utilization of the foot to maintain the wheel in motion. As a result, most potter's wheels are powered by an electric motor which has a variable mechanical or electrical speed-control foot pedal in conjunction therewith.

Additionally, the typical potter's wheel has been made extremely heavy, that is in excess of 100 pounds, with certain potter's wheels weighing 300–400 pounds. The drives typically utilized for the potter's wheels are gear-reduction mechanisms, pulleys, or direct drive cones. While these various types of drives are utilized, all have been found to be extremely expensive as well as being extremely heavy, and thus nonportable.

With the increased popularity of pottery making, both as a hobby and as a profession, the need has arisen for a light-weight, portable, simple and inexpensive potter's wheel which can still be utilized in the traditional fashion of the skilled thrower. The present invention provides such a potter's wheel which can be utilized by amateur, as well as professional, to fashion the desired ware.

SUMMARY OF THE INVENTION

A potter's wheel drive system comprises a wheel rotatable about a shaft and having a downwardly depending lip. The inner surface of the lip forms a drive surface. A motor shaft is connected to the drive member and is spring loaded against the wheel drive surface to form a means for imparting rotational movement of the shaft.

DESCRIPTION OF THE PREFERRED EMBODIMENTS

Figure 1:
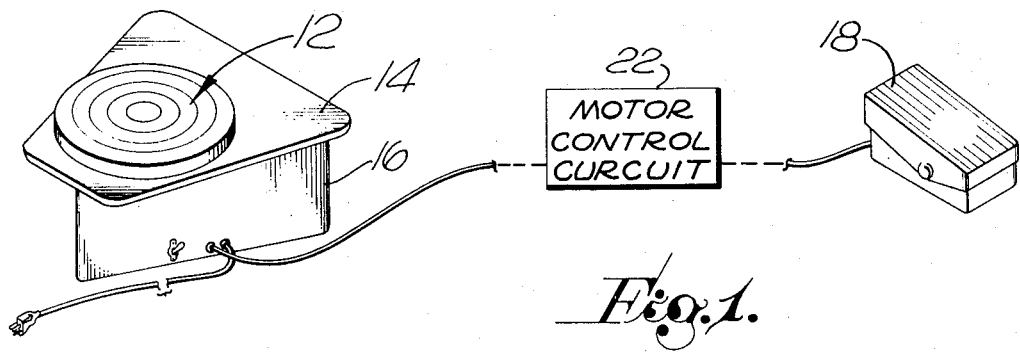
FIG. 1 is a schematic perspective view of a potter's wheel incorporating the drive motor control system.

Referring now to the drawings, there is shown a potter's wheel system made in accordance with the invention. A potter's wheel head 12 is shown mounted on a trapezoidal shaped table 14 which is in turn secured to a case 16. To rotate the wheel, a motor contained in the case 16 is controlled by means of a foot pedal 18, which may be utilized in turn to control an electronic speed control mounted therein. The electrical connections are made to the motor in the case 16 from the foot pedal 18 through a motor control circuit 22. Typically, the motor control circuit, which may be mounted in the case 16 or externally thereof, comprises a conventional silicone-controlled rectifier or triac feedback circuit which maintains a relatively constant speed of the motor irrespective of the load. Thus, should the operator apply increasing or decreasing loads to the wheel head 12 as he draws the clay, the motor control circuit will provide a corresponding feedback signal to regulate and control the speed of the motor.

Figure 2:
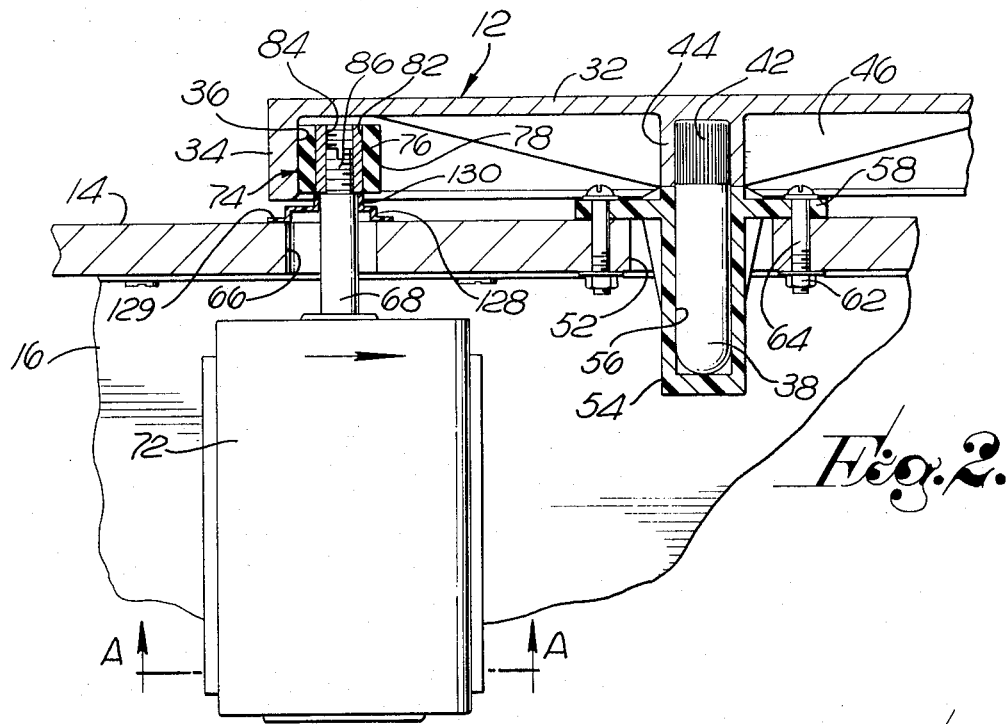
FIG. 2 is a cross-sectional view partly in cross section of the wheel and motor drive of FIG. 1.

Referring now to FIG. 2, the wheel head 12 is shown in cross-section in the form of a top flat circular disc 32 upon which the clay is normally thrown. Depending downwardly from the periphery of the circular disc is a downwardly extending lip 34 whose inner surface 36 forms a drive surface. The wheel head 12 is normally made of die-cast aluminum, so as to be of lightweight construction and is integrally cast with a steel shaft 38. The wheel shaft 38 has a knurled top surface 42 with the wheel material injection-molded around the knurled surface 42 so as to form a downwardly extending cylindrical boss 44 around the knurled portion of the shaft. In addition, during the die casting, stiffening ribs 46 may be formed on the bottom surface of the wheel, extending from the outer surface of the boss 44 to the bottom surface of the disc portion 32. The table 14 is normally formed of wood which is finished in a formica surface, enabling it to be readily cleaned with a wet cloth. Alternatively, the table 14 could be made of injection molded plastic or drawn sheet metal and could incorporate a splash-and-drip catching pan.

A first opening 52 extends through the trapezoidally shaped table 41 and a self-lubricating bearing 54 made of nylon or similar material is inserted therein which extends into the case 16. The bearing 54 contains a bore 56 into which the free end of the wheel shaft 38 may be inserted. An upper flange member 58 integral with the bearing 54 is secured to the top surface of the plate 14 by means of a nut 62 and bolt 64 arrangement.

A second opening 66 in the table 14 enables a motor drive shaft 68 to extend therethrough. The drive shaft is driven by a motor 72 mounted in the case 16 and contains a drive member 74 which is secured to the free end of the drive shaft 68. The drive member contains an outer cylindrical sleeve 76 made of rubber or similar material whose outer surface 78 meshes with the drive surface 36 of the downwardly extending lip 34. Within the outer sleeve 76 is a metallic inner sleeve 82 whose inner surface 84 may be threaded so as to secure the sleeve arrangement to the shaft 68 at its threaded end 86. Other conventional securing arrangements could be used as well.

Figure 3:
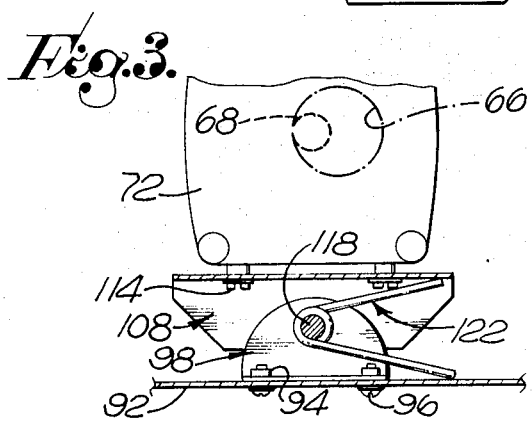
FIG. 3 is a fragmentary sectional view of the motor and drive illustrating the position of the motor with the wheel removed, taken along the line A—A of FIG. 2.
Figure 4:
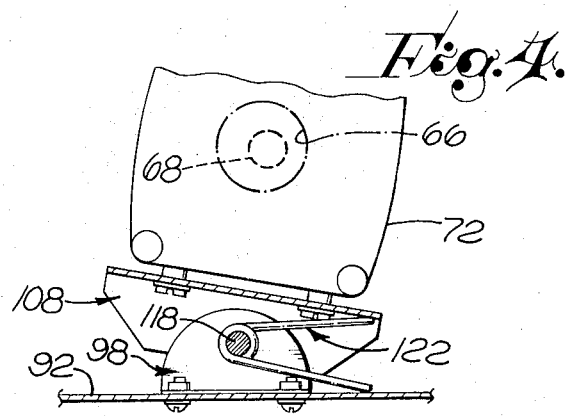
FIG. 4 is a fragmentary sectional view of the motor of FIG. 3 shown in a position with the wheel secured thereto.
Figure 5:
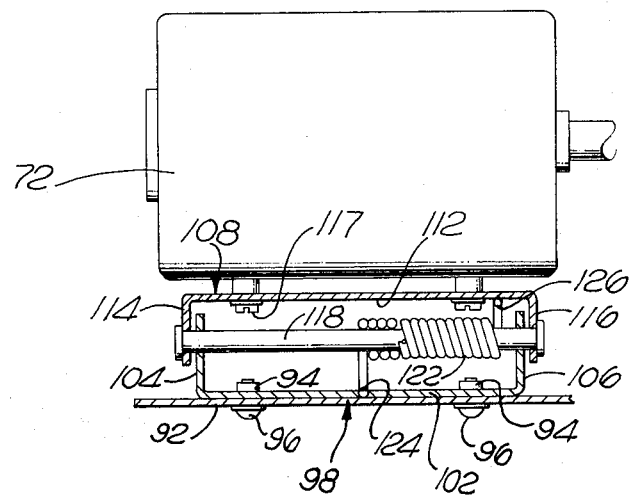
FIG. 5 is a fragmentary view illustrating the motor mounting mechanism.

The motor mount mechanism is shown in greater detail in FIGS. 3, 4 and 5. The motor mount mechanism is secured to a side wall 92 of the case 16 by means of a nut 94 and bolt 96 arrangement. The motor mount mechanism could also be modified to be secured to the bottom of the case as well. The motor mount mechanism includes a first inner U-shaped bracket 98 comprising a base 102 and a pair of side walls 104 and 106 and an outer U-shaped mounting bracket 108 formed of a base 112 and a pair of side walls 114 and 116. The nut 94 and bolt 96 arrangement is used to secure the base 102 of the bracket 98 to the side wall 92. The base 112 of the bracket 108 is secured by means of screws 117 to the motor housing 72. Both brackets are pivotably mounted on a spindle 118 which extends through the side walls 104, 106, 114 and 116. In addition, a spring 112 is received by the spindle 118, with a first end 124 of the spring abutting the base 102 of the bracket 98 and the opposite end 126 of the spring abutting the base 112 of the bracket 108.

Referring once again to FIG. 2, a flexible gasket 128 has a flange portion 129 secured to the top surface of the plate 14 around the opening 66. The gasket also has an upwardly extending sleeve 130 which surrounds the shaft 68. The sleeve 130 and flange portion forms a sufficient protective seal so that the motor 72 is protected from material on the wheel head 12 entering the case 16. When the wheel head 12 is removed from the plate by pulling the wheel shaft 38 out of the bearing 54, the spring 122 as can be seen in FIG. 3, causes the motor to pivot on the spindle 118 so that the motor drive shaft 68 engages one side of the opening 66. To reposition the motor drive shaft 68 with respect to the wheel head 12, the motor is shifted in a direction shown by the arrow in FIg. 2 by applying a force to the sleeve 78, enabling the drive surface 36 to once again engage the outer surface of the sleeve 76.

As can be seen in FIGS. 2 and 4, with the wheel shaft 38 in the bearing 56, and the outer surface 78 of the cylinder 76 abutting the drive surface 36 of the wheel head 12, the spring 122 causes the motor and its shaft to be spring biased in a direction opposite to the arrow in FIG. 2. Thus, a maximum amount of friction drive will be transmitted between the outer surface of the sleeve 78 and the wheel drive surface 36. Alternatively, it should be understood that the drive surface 36 of the wheel could be formed of gear teeth which mesh with a gear formed on the cylinder 76. This gear arrangement could then be used to drive the wheel in place of the friction drive system illustrated.

Figure 6:
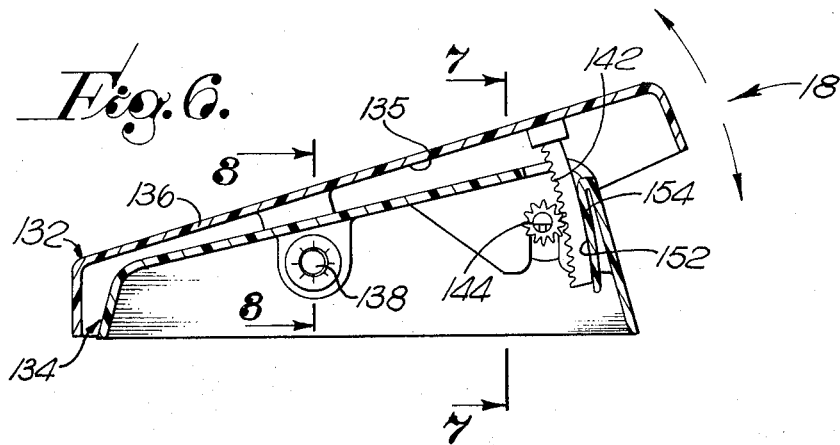
FIG. 6 is a side view in section of the foot pedal used with the system.
Figure 8:
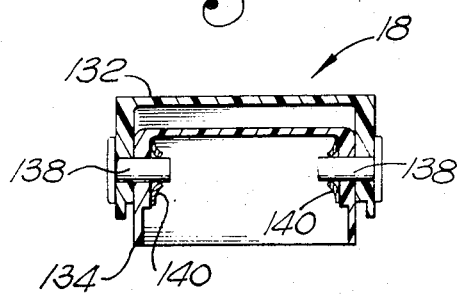
FIG. 8 is a sectional view of the pedal taken along the line 7—7 of FIG. 6.
Figure 7:
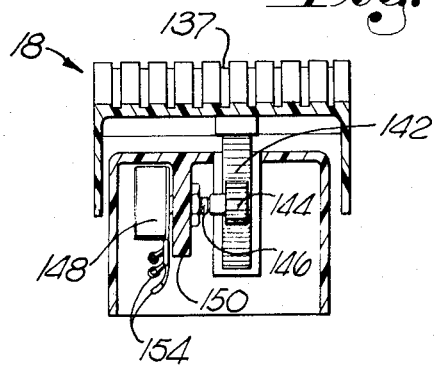
FIG. 7 is a sectional view of the foot pedal taken along the line 7—7 of FIG. 6.

Referring now to FIGS. 6, 7 and 8, the foot pedal 18 is shown in greater detail and comprises an upper foot-activated rocker member 132 and a lower supporting base member 134 which are nestably mounted with respect to each other. The lower base member is normally positioned during operation with its bottom surface on the floor and the upper rocker member 132 comprises a top surface 136 upon which the wheel operator's foot is normally positioned so as to vary the speed of the wheel 12. The upper surface 136 normally contains ridges 137 for preventing slippage of the foot when rested thereon.

A pair of hinge pins 138 are held on by pull washers 140 and mounted so as to pivotably connect the adjacent side walls of the members 132 and 134, enabling the rocker member 132 to rotate with respect to the base member 134. A rack gear 142 is positioned so that one end thereof is secured to the inner top surface 135 of the upper rocker member 136 with the teeth of the rack gear 142 extending downwardly at an angle. A pinion gear 144 is secured to a shaft 146 as can be seen in FIG. 7, so that rotation of the pinion gear 144 and the shaft 146 can simultaneously cause the setting of a potentiometer or capacitor 148 to vary. As can be seen in FIG. 6, movement upward or downward of the upper member 132 in the directions shown by the arrows causes the rack gear 142 to move the pinion gear 144 which in turn varies the potentiometer or capacitor setting. In addition terminals 154 are used to connect conductors (not shown) between the potentiometer or capacitor 148 and the motor control circuit 22.

An integrally formed spring 152 which depends downwardly from the top surface of the inner member 134 abuts the non-gear tooth side 154 of the rack 142 and causes the rack and pinion gear teeth to mesh continuously. Typically, the rack gear 142 and pinion gear 144 may be made of nylon, enabling the spring 152 to enhance meshing of the gears. The spring 152 and the friction caused by the pull washers 140 on hinge pins 138 enables the operator to remove his foot from the surface 136 and the rack and pinion gears will remain in their fixed position, enabling the wheel to continue to rotate at a predetermined desired speed. As can be seen, the foot control 18 is a heel and top type control. With downward movement of one end of the upper member 132, the rack gear 142 is moved, causing the pinion gear to rotate in one direction, whereas when pressure is applied at the other end of the member 132, the rack gear causes the pinion gear to rotate in an opposite direction.

While the outer surface 78 has been illustrated as driving the inner surface of the lip 34, it should be understood, of course, that the wheel head 12 could be driven on the outer surface of the lip as well, directly or through a gearing arrangement.

I claim:

1. In a potter's wheel drive system comprising:
a wheel rotatable about a wheel shaft and having a downwardly depending lip whose surface forms a drive surface; and a motor having a drive shaft which is connected to the interior of a drive member rotatable with the motor drive shaft, said motor being fixedly secured to and supported by a spring-loaded bracket, the outer surface of said drive member engaging the wheel drive surface for imparting rotational movement to said wheel, a base structure having pivot means, said bracket pivotally mounted on said base structure by said pivot means, a spring coiled about said pivot means biasing said bracket so as to tilt said bracket bringing said drive member into frictional engagement with said downwardly depending lip.

2. A potter's wheel drive system in accordance with claim 1 wherein said drive member frictionally engages said drive surface.

3. A potter's wheel in accordance with claim 1 wherein said wheel is removably secured to a housing having an opening therein for insertion of said wheel shaft.

4. A potter's wheel drive system in accordance with claim 3 wherein said housing opening has a molded bearing secured thereto to receive said wheel shaft.

5. A potter's wheel drive system in accordance with claim 4 wherein said wheel is integrally die-cast around said wheel shaft.

6. A potter's wheel drive system in accordance with claim 1 and further comprising a motor speed control circuit including means for maintaining the speed of said motor relatively constant irrespective of the load applied to said wheel.

7. A potter's wheel drive system in accordance with claim 1 wherein said motor is fixedly secured to said bracket, said bracket and said motor being pivotly movable together by means of said spring.

8. A potter's wheel drive system in accordance with claim 7 wherein said spring is wound around a spindle forming said pivot means, said bracket being pivotly movable with respect to said spindle, one end of said spring abutting said bracket and the other end of said spring abutting a fixed surface.

9. A potter's wheel drive system in accordance with claim 8 wherein said bracket is formed of a planar base and a pair of sidewalls extending in a plane perpendicular to said base, said motor housing being secured to said planar base and said spindle extending through openings in said sidewalls.

* * * * *

UNITED STATES PATENT OFFICE
CERTIFICATE OF CORRECTION

Patent No. 3,796,105            Dated March 12, 1974

Inventor(s) George Menard

It is certified that error appears in the above-identified patent and that said Letters Patent are hereby corrected as shown below:

Column 4, line 34, "top" should be --toe--.

In Claim 3, --drive system-- should be inserted after the word "wheel" in line 1.

Signed and sealed this 13th day of August 1974.

(SEAL)
Attest:

McCOY M. GIBSON, JR.             C. MARSHALL DANN
Attesting Officer                Commissioner of Patents